Aug. 28, 1951  A. L. HENDERSON  2,565,727
PHOTOELECTRIC PARING APPARATUS
Filed June 25, 1949  3 Sheets-Sheet 1
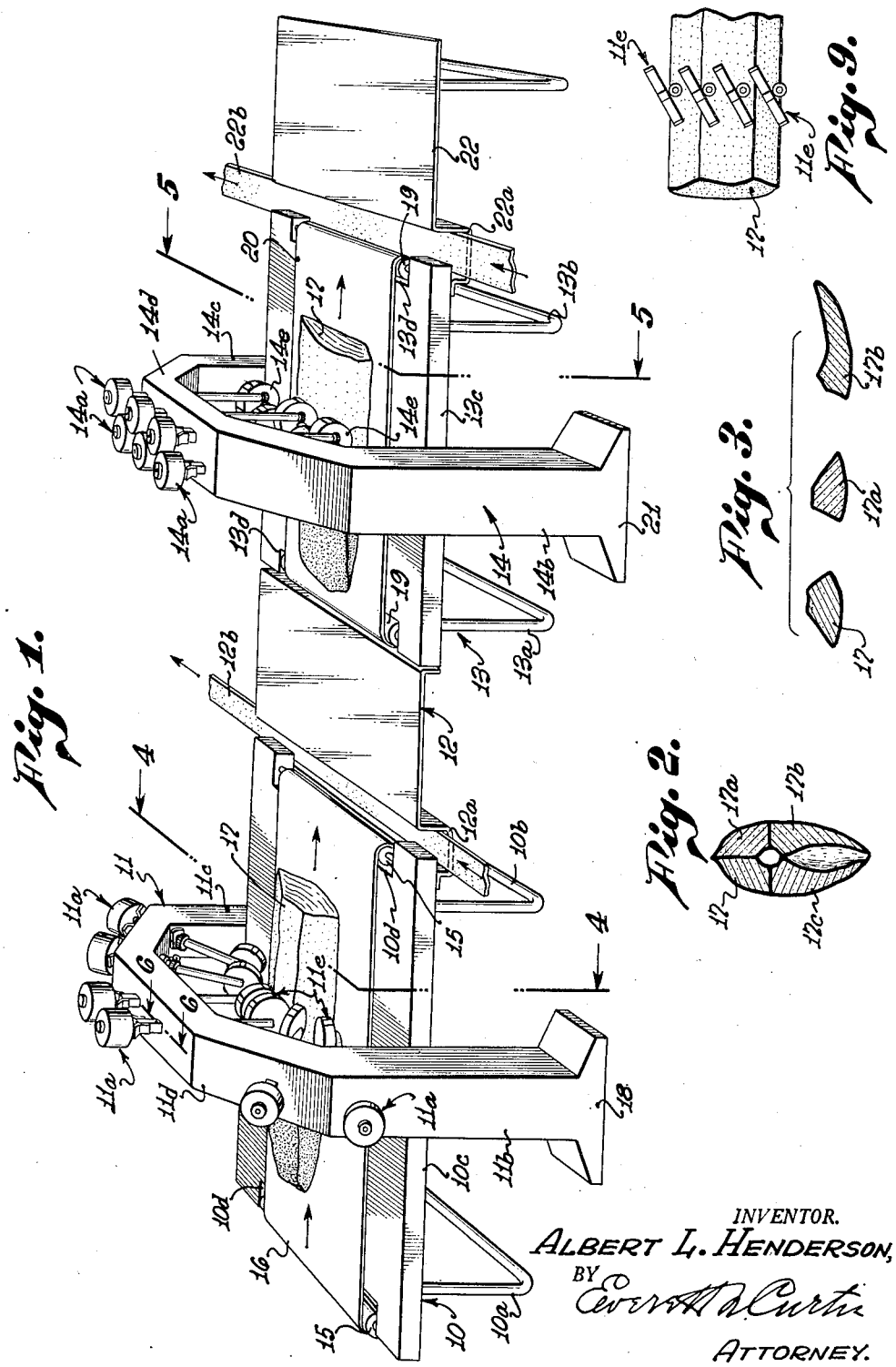
INVENTOR.
ALBERT L. HENDERSON,
BY
Everett A. Curtis
ATTORNEY.

Aug. 28, 1951  A. L. HENDERSON  2,565,727
PHOTOELECTRIC PARING APPARATUS
Filed June 25, 1949  3 Sheets-Sheet 2
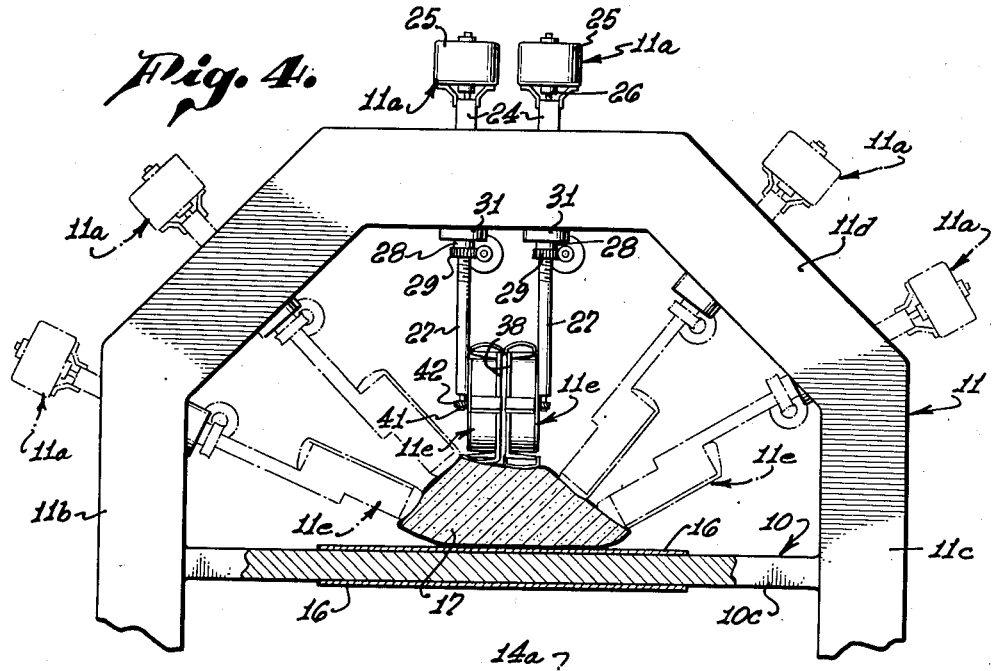
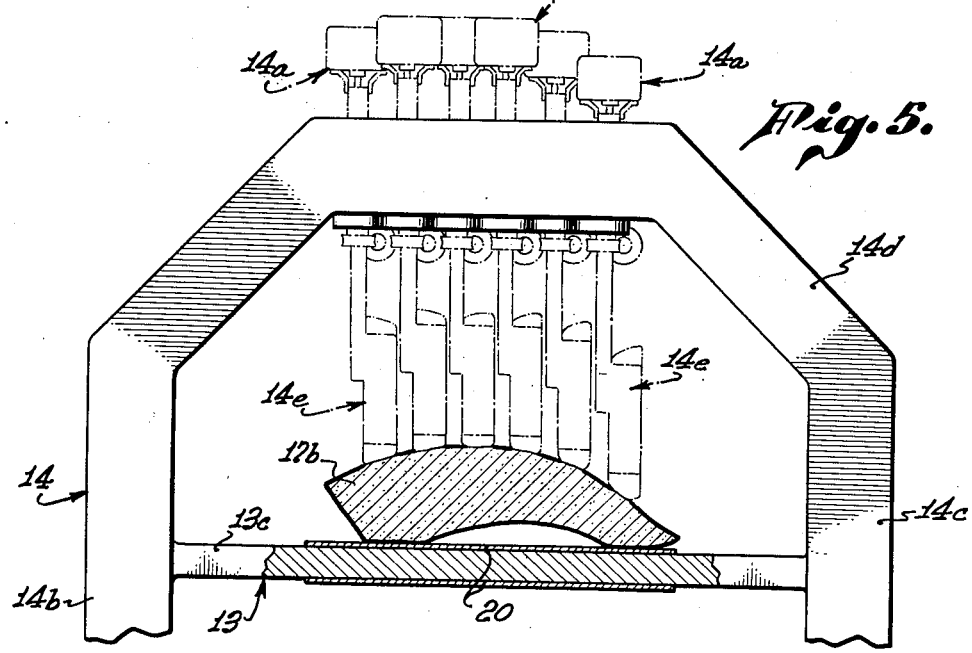
INVENTOR.
ALBERT L. HENDERSON,
BY
Everett N. Curtis
ATTORNEY.

Aug. 28, 1951     A. L. HENDERSON     2,565,727
PHOTOELECTRIC PARING APPARATUS
Filed June 25, 1949     3 Sheets-Sheet 3
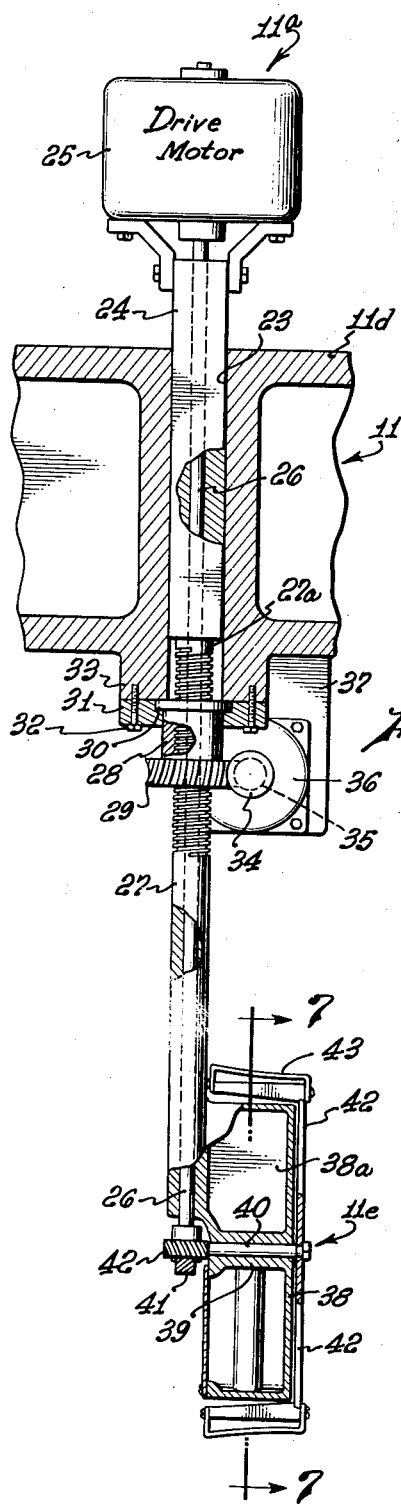
INVENTOR.
ALBERT L. HENDERSON,
BY
Everett L. Curtis
ATTORNEY.

Patented Aug. 28, 1951

2,565,727

UNITED STATES PATENT OFFICE 2,565,727

PHOTOELECTRIC PARING APPARATUS

Albert L. Henderson, San Diego, Calif.

Application June 25, 1949, Serial No. 101,361

7 Claims. (Cl. 17—4)

My invention relates to photo-electric paring apparatus, particularly as employed for the removal of dark meat from tuna or other fish of the mackerel family, and its objects are, to effect such removal successfully through apparatus employing mechanical, electrical, and photo-electrical means; to dispense to a large extent with the labor heretofore found necessary for said purpose, and to bring about more uniform and satisfactory results; to reduce the space and facilities in plants heretofore devoted to the purpose, and to allow the installment of the apparatus upon fishing boats where canning is provided for thereon in remote fishing grounds; to render the parts readily accessible for inspection, adjustment, replacement, restoration or repair, and generally to provide paring apparatus for the said purposes which is simple and economical of construction, efficient in action and of long life and durability. These and other objects will appear from the drawing and as hereinafter more fully set forth and described.

As is well known, the general practice pursued at the present time in preparing tuna or like fish of the mackerel family for canning, is first to remove entrails and to pre-cook the fish; second, to clean the fish by scraping the skin, and then to fillet and quarter the fish so as to expose the dark meat; third, to remove all the bones and the dark meat by hand from the said quarters, and to cut such quarters to canning size. The reason for the removal of the dark meat, is that it has a stronger taste and odor than that of the white meat, and if not removed therefrom, imparts a disagreeable flavor thereto, and is accordingly objectionable to many people.

So far as I am aware, there is no mechanical, electrical or photo-electrical apparatus in the art prior to my invention capable of performing the paring functions thereof, or as particularly adapted for the removal of dark meat from quarter sections of fish of the mackerel family. With my apparatus, provided with two sets of cutting mechanisms, upon such fish being broken up into its natural quarter sections, known in the trade as "loins," each loin is fed upon a black belt into the first set, the inside of said loin facing upwardly while it is illuminated and exposed to the action of cutters actuated by photo-electric means cooperating with other means solely to cut away the dark meat so exposed. Thereupon, the loin is removed and turned over and is fed upon a black belt into the second set of cutting mechanisms with the outside of said loin facing upwardly where solely the dark meat is cut away and removed in a manner similar to that carried out by the first set.

Attention is hereby directed to the accompanying drawing, illustrating a preferred form of fish paring apparatus embodying my invention, in which similar numerals of designation refer to similar parts throughout the several views, and in which—

Figure 1 is a view in perspective of my improved apparatus embodying two sequential work tables, each of which is provided with a set of cutting mechanisms, said tables having therebetween with an intermediate table for turning over the fish loin while passing from the first table to the second, the arrangement of parts being largely schematic in character.

Fig. 2 is a cross section of a tuna fish showing its structural division into quarters or loins, and showing the dark portions thereof as they naturally occur;

Fig. 3 are quartered sections of the tuna shown separated one from the others, and showing the dark portions covering the exterior surfaces thereof;

Fig. 4 is a view partly in section of the first set of cutting mechanisms shown in Fig. 1, looking in the direction of the arrows 4—4, and also being a side view of a number of the cutter units, some of which are indicated in dashed lines and the cutters of which are shown separated for the purpose of better illustration;

Fig. 5 is a view partly in section of the second set of cutting mechanisms shown in Fig. 1, looking in the direction of the arrows 5—5 and showing in dashed lines a number of cutter units, which are here shown with the cutters separated for the purpose of better illustration;

Fig. 6 is a cross section on line 6—6 of Fig. 1 looking in the direction of the arrows and showing one of the cutter units in detail, some of the parts being shown in elevation;

Fig. 7 is a cross section on line 7—7 of Fig. 6, looking in the direction of the arrows, and showing diagrammatically the location of the source of light and photo-electric cell when in operating position over the fish;

Fig. 8 is a wiring diagram for one of the cutter units, showing the electric wiring connections for the sequence of operations required for cutting away and removal of dark meat from one of the loins, and Fig. 9 is a view looking directly down upon the cutter heads with the parts above removed, showing the preferred diagonal or staggered arrangement thereof over the loin in order that the blades of the cutters may overlap and contact the entire upper surface of the loin and be in position to cut away and remove the dark meat therefrom.

Referring to Fig. 1 of the drawing, I have there shown perspectively and schematically a form of my invention, comprising, in sequence of operation, the first work table 10, and archway support 11 carrying the set of cutter units 11a therefor, the intermediate table 12, and the second work table 13 and archway support 14, carrying the set of cutter units 14a therefor; each of said work tables and cutting mechanism therefor, being similar to the other except that the cutting mechanism of table 10 is specially adapted for removinng the dark meat from the surface of the turned upwardly inner walls of a tuna loin, and the cutting mechanism of table 13 is specially adapted for removing the dark meat from the surface of the turned upwardly outer curved wall of said loin.

As shown in the drawing, the first work table 10 is constructed with the legs 10a and 10b, the top 10c, being provided in the ends thereof with recesses 10d and rollers 15 located within said recesses and extending between and pivotally mounted upon the opposite walls thereof; a movable endless belt 16, black or dark in color, engaging with said rollers and arranged readily to pass continuously over and under the table top 10c, and to carry thereon through the arch of the archway support 11, a tuna loin 17, with inside face exposed. This archway support 11 is constructed with two supporting columns or standards 11b and 11c provided with feet 18 adapted to rest upon the ground surface contacted by said table legs; which columns are connected by the arch 11d, serving separately to mount thereon the cutter units 11a, the cutters of each of which through means hereinafter described caused to move toward and to make cutting engagement with the dark meat upon the exposed adjacent surfaces of the loin and to cut away the same down to the white meat, and upon the white meat being immediately to move away and to cease such engagement. While for the purposes of better illustration, the cutter heads 11e of the units 11a shown in Figs. 1 and 4 are shown somewhat separated, it is my desire in actual practice to provide a much larger number of said heads and to incline such heads so that the blades of the same may be diagonally spaced as shown in Fig. 9, or otherwise positioned and spaced, in order to secure complete cutting coverage of the exposed surface of the loin; said cutter units and cutters mounted thereon, being carefully positioned and adjusted to follow the normal inside contours of the loin of the particular size of fish selected for treatment.

The second work table 13 and associated parts is similar to work table 10 and parts above described and is constructed with the legs 13a and 13b, the top 13c being provided in the ends thereof with recesses 13d, and the rollers 19 located within said recesses and extending between and pivotally mounted upon the opposite walls thereof; a movable endless belt 20, dark or black in color, engaging with said rollers and arranged readily to pass continuously over and under the table top 13c, and to carry thereon through the arch of the archway support 14, a tuna loin 17 with outside face exposed. This outside support 14 is constructed with two supporting columns of standards 14b and 14c provided with feet 21 adapted to rest upon the ground surface contacted by legs 14b and 14c; which columns are connected by the arch 14d, serving to mount thereon the cutter units 14a, the cutters 14e, of which are through the means hereinafter described caused to move toward and to make cutting engagement with the dark meat upon the exposed adjacent surfaces of the loin and to cut away said dark meat down to the white meat, and upon the white meat being at any time exposed beneath, immediately to move away and to cease said engagement. While as in the case of the cutter units 11a, I have for purposes of better illustration shown the cutter heads of the units 14a somewhat separated, I desire in practice diagonally to arrange and adjust said heads and the cutters thereof in the same manner as described in connection with cutter units 11a, except that said cutter units 14a and parts thereof are to be positioned and adjusted to follow the normal outside contours of the loin of the fish.

Preferably secured to the adjacent ends of the table tops 10c and 13c and intermediate thereof is the flat table 12, provided therebetween with the gutter 12a and belt 12b passing therethrough, serving as a means for the disposal of the dark meat cut away as aforesaid by the cutting mechanism of table 10; the said table 12 also being secured at its outer end to the shelf or disposal tray 22 and having provided therebetween the gutter 22a and belt 22b passing therethrough and serving a purpose similar to gutter 12a and belt 12b.

In Fig. 2, I have depicted in cross section the central body portion of a tuna fish, and have shown its natural division, by its back bone, ribs and body cavity, into the right and left dorsal quarters or loins 17 and 17a, and the right and left ventral quarters or loins 17b and 17c. In Fig. 3, I have shown these quarters separated one from the others, except that the quarter 17b has been omitted because substantially identical with the quarter 17c. All of these quarters as shown in both Figs. 2 and 3, are covered at this portion of the fish with a layer of dark meat, which layer uniformly extends over the entire surfaces of the loins; and it is this meat that my apparatus is designed to pare away and remove mechanically through the employment of the photo-electric cutting units and mechanism cooperating therewith shortly to be described in detail.

Since each of the cutter units 11a and 14a of the two sets of cutting mechanism is of the same construction and organization, it will be necessary to describe only one of such units, and accordingly attention is directed to Figs. 6 and 7 showing the parts of the unit 11a, and to Fig. 8 showing diagrammatically the electric connections thereof. Thus, there is shown in Fig. 6, an enlarged section of the framework forming the arch 11d, through which vertically extends the cylindrical opening 23, shaped to receive and to permit reciprocation therein of the upper barrel 24; the top of said barrel being secured to the casing of the drive motor 25, and the bore of said barrel being shaped to receive and to permit rotation therein of the upper portion of the depending shaft 26 of said motor. Integral with or welded or otherwise secured to the bottom end of the barrel 24, is the head 27a of the lower barrel 27 the outside of which is threaded to engage with the wall of the passageway extending through the hub 28 of the worm gear 29; the end of said hub being formed with the annular ridge 30 and being journalled within the ring bearing 31, secured by cap screws 32 to the annular projection 33 of the arch lid. Meshing with the worm gear 29 is the worm gear 34 upon the shaft 35, operatively connected with the conventional bi-directional hydraulic control mechanism 36, mounted upon the lower extension 37 of the arch lid.

As shown, the lower barrel 27 extends downwardly to a substantial extent and has its bore shaped to receive and to permit rotation therein of the shaft 26; the lower portion of said barrel having integral therewith or firmly secured thereto the cylindrical casing 38, provided with webs 38a connected with and supporting the centrally located bearing 39, in which is journalled the counter shaft 40, having at the inner end thereof the worm gear 41 meshing with the worm gear 42 upon the lower end of shaft 26. Mounted upon the outer end of the counter shaft 40 and rotating therewith is the cutterhead 11e, having the radiating arms 42, on the outer end of each of which is mounted a cutter blade 43, carefully shaped to engage with, and adjusted at the proper angle for paring, the surface of the area of the loin that it is disposed to contact.

As diagrammatically shown in Fig. 7, straight tubes 44 and 45 are mounted upon webs 38a within and upon the casing 38 and each is inclined and positioned so as to point directly at the precise area of the surface of the loin exposed to the cutting action of the blades 43; a conventional light 44a being mounted within and upon said casing and located so that the light thereof may be cast downwardly through the hollow of the tube 44 to illuminate the said area, and a conventional photo-electric cell 45a being mounted within and upon said casing and located so that the light reflected from the said area, when the white meat is exposed upon the cutting away of the dark meat by the said blades, may pass upwardly through the hollow of the tube 45 to impinge upon the said cell and raise the potential thereof and, through electric connections with the hydraulic cutter control mechanism, automatically to cause the cutter head and blades to be slightly elevated and to be withdrawn from the loin and all cutting to cease so long as the area of the white meat continues to be illuminated. Upon the loin proceeding upon the table so as to bring the dark meat within such illuminated area, the potential of the photo-cell will drop and its action upon the hydraulic cutter control mechanism will cause the cutter head and blades to reengage the face of the loin and the cutting operation to be resumed.

This operation will readily be understood from a consideration of the wiring diagram of Fig. 6, where the electric connections of the photo-electric cell 45a are set forth. Thus, the light reflected from the exposed white meat of the loin will strike upon said photo-electric cell and thereby raising the potential thereof, and, through the circuit 46 connected with the control amplifier 47, causing an increased flow of current through relays and circuit 51 to the control arm of the bi-directional hydraulic mechanism 36. Thereupon, such mechanism is activated and through its gear connections with the threaded portion of the barrel 27 causes the said barrel slightly to rise carrying upwardly with it the cutter head and blades thereon away from contact with the loin. When, however, the loin is advanced upon the belt and the dark meat brought into the circle of illumination, the potential of the photo-electric cell will drop, the flow of current to the hydraulic mechanism will cease, and the blades of the cutter head will again contact the loin and cutting will be resumed until the white meat is again exposed, when as above set forth the blades will again be retracted. This operation is usually sufficient to pare away the dark meat from the face of the loin, but may be repeated if necessary to recover any of such meat still remaining to be removed. Also shown in Fig. 8 is the circuit 48 connecting the regulated power supply 49 with the light bulb 44a. Lead 50 is for the purpose of feeding stable voltages into the control amplifier 47 from said power supply 49.

If desired, two photo-electric cells 45a and two light bulbs 44a, with tubes 45 and 44 therefor may be provided for each cutter unit, in order that mechanical and electrical lags may be avoided or guarded against, and in the interest of efficiency the slowing up of the operation thereby prevented. Also, as is obvious, while I preferably locate the drive motor of each unit at the top of the barrel 24, above the shaft 26, it may be placed adjacent to the lower end thereof or it may be located in any position found convenient for the purpose and conventionally geared to said shaft.

While I have described my apparatus as especially constructed for the paring of dark meat from tuna or other fish of the mackerel family, I do not except as limited by the appended claims, desire to limit my invention to a construction solely adapted to such purpose; it being apparent that, through the use of the photo-electric cell, the said apparatus readily could be adapted for paring or cutting away and removing any outside covering of one color from the underlying mass of yielding material of a different color, including not only meats, but also fruits, vegetables, and other matter with skins and bodies of unlike or contrasting colors.

By the use of the word "carriage," as used in the claims, I desire to be understood as including any equivalent means which could be employed for accomplishing the transportation of the tuna loin or other load to be pared under the cutter mechanism in position to be operated upon.

My invention may be embodied in other specific forms without departing from the spirit or essential characteristics thereof. The present embodiments, as above set forth are therefore to be considered in all respects as illustrative and not restrictive, the scope of my invention being indicated by the appended claims rather than by the foregoing description, and all changes which may come within the meaning and range of equivalency of the claims are therefore intended to be embraced therein.

What I claim and desire to secure by Letters Patent is:

1. In photo-electric fish-paring apparatus, the combination of a table, an endless dark belt mounted thereon, cutting mechanism mounted upon said table above said belt and adapted for following the contours of, and cutting off the dark meat covering of a tuna loin passing beneath upon said belt, means connected with said table for the operation of said cutter mechanism, and photo-electric means connected with said cutter mechanism for limiting the operation of the same solely to the removal of said dark meat and for the cessation of said operation upon the exposure of the light meat beneath.

2. In photo-electric fish-paring apparatus, the combination of a table, an endless dark belt mounted thereon, a set of cutter paring units mounted upon said table above said belt and adapted for following the contours of, and cutting off, the dark meat covering of a tuna loin passing beneath upon said belt, means connected with said table for the independent operation of each of said cutter units, and photo-electric means connected with each of said cutter units for limiting the operation of the same solely to the removal of said dark meat and for the cessation of said operation upon the exposure of the light meat beneath.

3. In photo-electric fish-paring apparatus, the combination of a table, an endless dark belt mounted thereon, an archway located to extend over said belt and table cutting mechanism mounted upon said archway above said belt and adapted for following the contours of and cutting off the dark meat covering of a tuna loin passing beneath upon said belt, means for the operation of said cutter mechanism, and photo-electric means connected with said cutter mechanism for limiting the operation of the same solely to the removal of said dark meat and for the cessation of said operation upon the exposure of the light meat beneath.

4. In photo-electric fish-paring apparatus, the combination of a table, an endless dark belt mounted thereon, an archway located to extend over said belt and table a set of cutter paring units mounted upon said archway and adapted for following the contours and cutting off the dark meat covering of a tuna loin passing beneath upon said belt, means cooperating with each of said cutter units for the operation of said cutter units, and photo-electric means connected with each of said cutter units for limiting the operation of the same solely to the removal of said dark meat and for the cessation of said operation upon the exposure of the light meat beneath.

5. In photo-electric paring apparatus, the combination of a table, a carriage mounted to move thereover, cutting mechanism mounted over said table above said carriage and adapted for following the contours and paring the surface covering of one color from a mass of yielding material of another color, passing beneath upon said carriage, means connected with said table for the operation of said cutter mechanism, and photo-electric means for limiting the operation of the same solely to the removal of said colored covering and for the cessation of said operation upon the exposure of the other colored material beneath.

6. In photo-electric fish-paring apparatus, the combination of a table, a carriage mounted to move thereover, cutting mechanism mounted over said table above said carriage and adapted for following the contours and paring the surface covering of one color from the contrasting colored body of a fish loin passing beneath upon said carriage, means connected with said table for the operation of said cutter mechanism, and photo-electric means for limiting the operation of the same solely to the removal of said colored covering and for the cessation of said operation upon the exposure of the said contrasting colored body beneath.

7. In photo-electric fish-paring apparatus, the combination of a table, a carriage mounted to move thereover, cutting mechanism mounted upon said table above said carriage and adapted for following the contours of, and cutting off the dark meat covering of a tuna loin passing beneath upon said carriage, means connected with said table for the operation of said cutter mechanism, and photo-electric means connected with said cutter mechanism for limiting the operation of the same solely to the removal of said dark meat covering and for the cessation of said operation upon the exposure of the light meat beneath.

ALBERT L. HENDERSON.

REFERENCES CITED

The following references are of record in the file of this patent:

UNITED STATES PATENTS

| Number | Name | Date |
| --- | --- | --- |
| 2,177,803 | Ferte et al. | Oct. 31, 1939 |
| 2,400,562 | Marihart | May 21, 1946 |
| 2,438,224 | Marihart | Mar. 23, 1948 |